United States Patent
Fujita et al.

(10) Patent No.: US 6,495,219 B1
(45) Date of Patent: Dec. 17, 2002

(54) LIQUID CRYSTAL COMPOSITION AND LIQUID CRYSTAL DISPLAY DEVICE

(75) Inventors: Hiroaki Fujita, Chiba (JP); Katsuyuki Murashiro, Chiba (JP); Etsuo Nakagawa, Chiba (JP)

(73) Assignee: Chisso Corporation, Osaka (JP)

( * ) Notice: Subject to any disclaimer, the term of this patent is extended or adjusted under 35 U.S.C. 154(b) by 116 days.

(21) Appl. No.: 09/670,687

(22) Filed: Sep. 28, 2000

(30) Foreign Application Priority Data

Sep. 30, 1999 (JP) .......................................... 11-280370

(51) Int. Cl.⁷ .......................... C09K 19/30; C09K 19/20
(52) U.S. Cl. .............. 428/1.1; 252/299.63; 252/299.66; 252/299.67
(58) Field of Search ....................... 252/299.63, 299.66, 252/299.67; 428/1.1

(56) References Cited

U.S. PATENT DOCUMENTS

| | | | |
|---|---|---|---|
| 5,589,102 A | 12/1996 | Bartmann et al. | 252/299.01 |
| 5,858,270 A | 1/1999 | Matsui et al. | 252/299.01 |
| 6,007,740 A | * 12/1999 | Andou et al. | 252/299.63 |

FOREIGN PATENT DOCUMENTS

| | | |
|---|---|---|
| DE | 199 43 357 | 4/2000 |
| EP | 0 786 445 | 7/1997 |
| EP | 0 844 229 | 5/1998 |
| GB | 2 229 438 | 9/1990 |
| JP | 5-112778 | 5/1993 |
| JP | 10-251186 | 9/1998 |

* cited by examiner

*Primary Examiner*—Shean C. Wu
(74) *Attorney, Agent, or Firm*—Wenderoth, Lind & Ponack, L.L.P.

(57) ABSTRACT

Liquid crystal compositions are disclosed which have low threshold voltage, small temperature dependence of the threshold voltage, high stability against heat and ultraviolet rays, and small frequency dependence of dielectric anisotropy ($\Delta\in$) at low temperature while fulfilling general characteristics required for STN mode materials, characterized by comprising the compound expressed by formula (1)

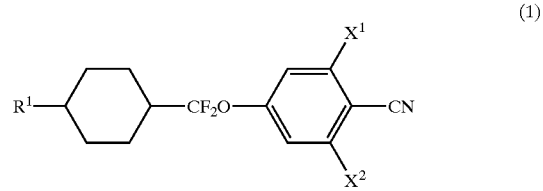

(1)

wherein $R^1$ represents alkyl having 1 to 10 carbon in which one methylene may be replaced by —O— or —CH=CH—; $X^1$ and $X^2$ each independently represents H or F.

4 Claims, 1 Drawing Sheet

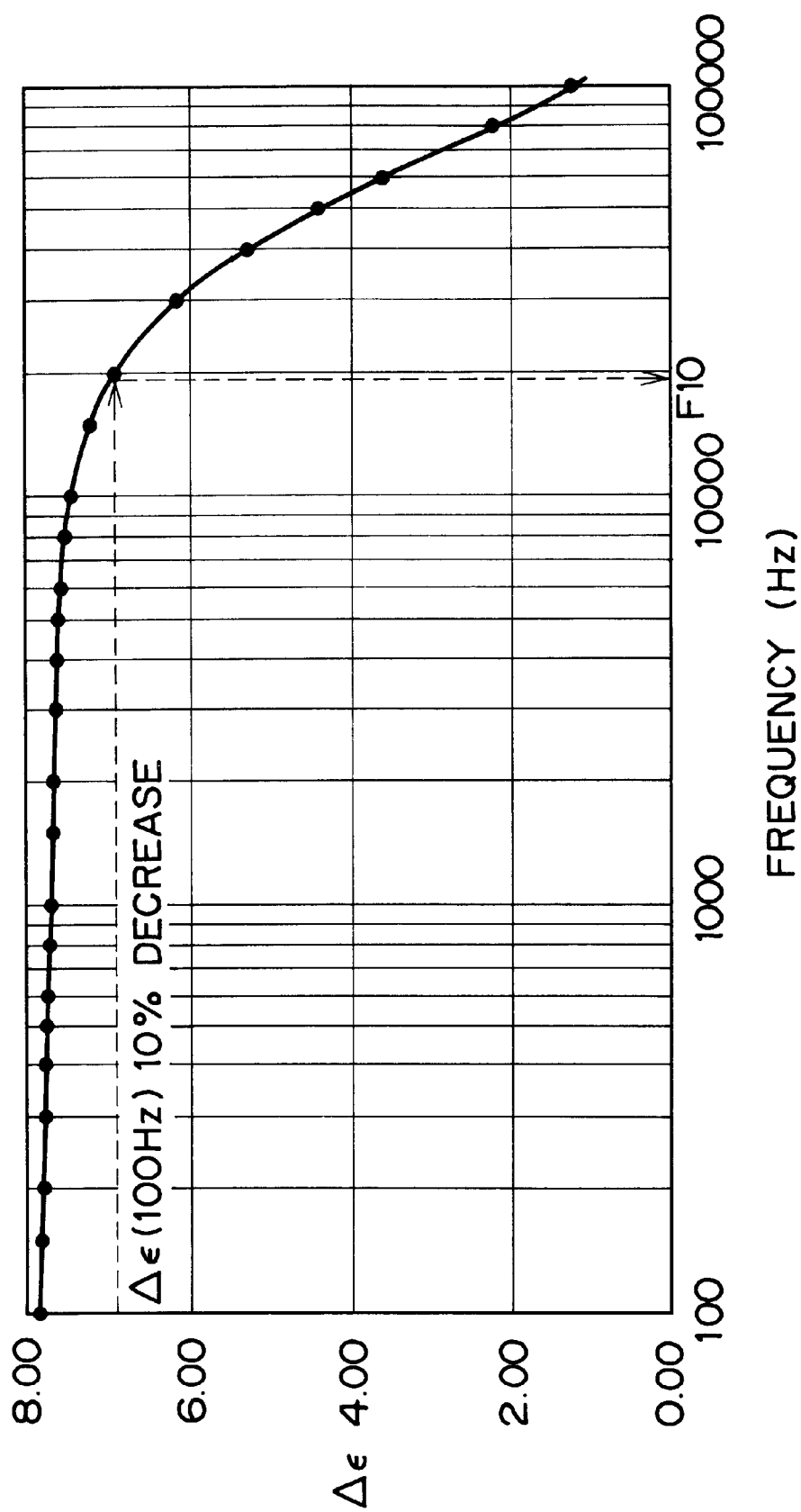

LIQUID CRYSTAL COMPOSITION AND LIQUID CRYSTAL DISPLAY DEVICE

TECHNICAL FIELD

The present invention relates to a nematic liquid crystal composition. More specifically it relates to a liquid crystal composition preferably used for liquid crystal display devices using STN (super twisted nematic) mode; and to a liquid crystal display device using the liquid crystal composition.

BACKGROUND ART

As for the liquid crystal display mode, display modes such as TN (twisted nematic) mode, STN (super twisted nematic) mode, and active matrix mode have been proposed and utilized one after another. Among these, STN mode proposed by T. J. Scheffer et al. (Appl. Phys. Lett., 45 (10), 1021 (1984)), in which orientation of liquid crystal molecules among upper and lower plates is twisted by 180 to 270°, has been adopted as a liquid crystal display device for personal computers and others.

Recently STN mode has been used as liquid crystal display devices for mobile information terminals used frequently in the outdoors such as electronic notes or small size note-type personal computers.

General characteristics required for STN mode was items (1) to (4) below, and items (5), (6) and (7) below are additionally required for liquid crystal materials for STN mode used in the outdoors.

(1) Steepness ($\gamma$) of voltage versus transmittance curve (V-T curve) of the liquid crystal composition should be as close to 1 as possible in order to enhance the contrast of the liquid crystal display device.

(2) Viscosity ($\eta$) of the liquid crystal composition should be as low as possible in order to accelerate the speed for display (response speed) of the liquid crystal display device.

(3) Optical anisotropy of the liquid crystal composition ($\Delta n$) should be able to have a proper value depending on the cell thickness of the liquid crystal display device in order to optimize the contrast of the liquid crystal display device.

(4) A liquid crystal composition should have a nematic phase over the wide range of temperature in order to widen temperature range of environment wherein the liquid crystal display device is used.

(5) Threshold voltage ($V_{th}$) of the liquid crystal composition should be low and the temperature dependence ($\delta$) of the threshold voltage of the liquid crystal composition should be small in order to downsize the battery which is the power source to drive the liquid crystal display device.

(6) The liquid crystal composition should be highly stable against heat and ultraviolet rays in order to prevent deterioration of the liquid crystal composition and to keep displaying quality of the liquid crystal display device semi-permanently.

(7) Frequency dependence of dielectric anisotropy ($\Delta \epsilon$) at low temperature region (below −10° C.) should be improved in order to enable display at such low temperature. Namely, $\Delta \epsilon$ value should be constant toward higher frequency area ($F_{10}$ value described later should be large).

As for the liquid crystal composition for STN mode which has relatively low threshold voltage and relatively good temperature characteristics of the threshold voltage (namely, small temperature dependence), compositions described in JP 7-300582 A, JP 7-300585 A and JP 7-300584 A can be illustrated.

However, the liquid crystal compositions disclosed therein have a drawback of poor stability against heat and ultraviolet rays as shown in Comparative Examples of the present application. WO 96/11897 proposed to provide a novel liquid crystal compound having large dielectric anisotropy together with extremely low viscosity as liquid crystal compounds used for low voltage in various modes such as active matrix mode or STN mode, and to provide a liquid crystal composition comprising the compound. It discloses the composition comprising the compound having —$CF_2O$— as a bonding group and 3,5-difluoro-4-cyanophenyl as a terminal group (Composition Examples 19 to 22). Furthermore, among these, the Composition Example 19 is similar to the composition of the present invention. However, the composition of Example 19 has drawbacks such as poor steepness, high threshold voltage, large temperature dependence of the threshold voltage, and large frequency dependence of dielectric anisotropy ($\Delta \epsilon$) at low temperature as shown in the Comparative Examples of the present invention.

Although many liquid crystal compositions have been studied, the liquid crystal composition for STN display mode used in the outdoors is currently required to fulfill further characteristics (5) and (6) described above in addition to characteristics (1) to (4) described above.

Further, for the use in a portable telephone, higher duty is intended in order to enlarge display capacity. Accordingly actual driving frequency goes higher and higher. As driving frequency goes higher, movement of liquid crystal molecules at low temperature can hardly follow frequency change of voltage resulting in severe problems such as tailing phenomena or poor displaying caused by lowering contrast. To avoid such poor displaying, the liquid crystal material is requested more and more to have excellent frequency dependence (small dependence of frequency) of $\Delta \epsilon$ at low temperature region in item (7): described above, namely, to have a constant value of $\Delta \epsilon$ up to the higher frequency region.

Examples 46, 47 and 49 of JP 10-251186 A disclose liquid crystal compositions which are similar to that of the present invention, however, these compositions did not solve the problem of the present invention which requires the improvement of frequency dependence of $\Delta \epsilon$ at low temperature region in item (7) described above, as Comparative Example of the present invention shows later.

DISCLOSURE OF THE INVENTION

The subject of the present invention is to provide a liquid crystal composition having low threshold voltage, small temperature dependence of the threshold voltage, high stability against heat and ultraviolet rays and, furthermore small frequency dependence of $\Delta \epsilon$ at low temperature.

The present inventors enthusiastically studied to evaluate compositions using various liquid crystal compounds for solving the problem. As a result, they found that the composition comprising specific two components of a first component and a second component, and furthermore excluding specific components from other components can solve the problem described above, and completed the present invention.

The liquid crystal composition of the present invention is indicated in items 1 to 4, and the liquid crystal display device of the present invention is shown in item 5 in the following.

The item 1 of the present invention is a liquid crystal composition characterized by comprising a first component consisting of the compound(s) expressed by formula (1) and a second component consisting of least one compound selected from the group of the compounds expressed by formulae (2-1) to (2-4).

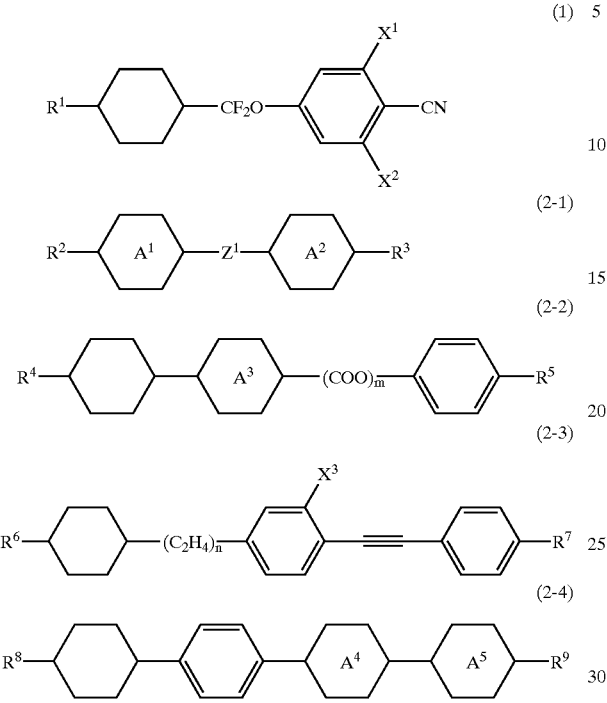

(1)

(2-1)

(2-2)

(2-3)

(2-4)

wherein $R^1$ represents alkyl having 1 to 10 carbon in, which one methylene may be replaced by —O— or —CH=CH—; $R^2$, $R^3$ and $R^4$ each independently represents alkyl having 1 to 10 carbon in which one methylene may be replaced by —O— or —CH=CH—, and one or more hydrogen may be replaced by fluorine; $R^5$ represents alkyl having 1 to 10 carbon in which one methylene may be replaced by —O—; $R^6$, $R^7$ and $R^9$ each independently represents alkyl having 1 to 10 carbon; $R^8$ represents alkyl having 1 to 10 carbon in which one methylene may be replaced by —O—; $A^1$, $A^2$, $A^3$ and $A^5$ each independently represents trans-1,4-cyclohexylene or 1,4-phenylene; $A^4$ represents 1,4-phenylene in which H at the lateral position may be replaced by F; $Z^1$ represents —C≡C— or a single bond; m and n each independently is an integer of 0 or 1; $X^1$, $X^2$ and $X^3$ each independently represents H or F.

The item 2 is a liquid crystal composition according to the item 1 which comprises 5 to 40% of the first component and 10 to 90% of the second component each based on the total weight of the liquid crystal composition.

The item 3 is a liquid crystal composition according to the item 1 or 2 wherein the liquid crystal composition further comprises a third component consisting of at least one compound selected from the compounds expressed by formulae (3) and (4).

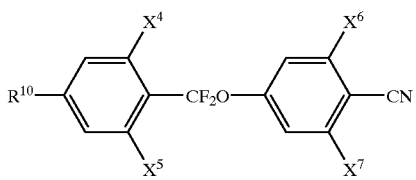

(3)

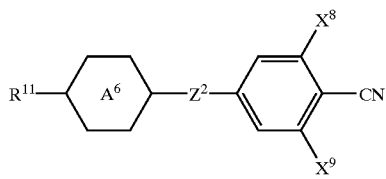

(4)

wherein $R^{10}$ and $R^{11}$ represent alkyl having 1 to 10 carbon in which one methylene may be replaced by —O— or —CH=CH—; $A^6$ represents trans-1,4-cyclohexylene, 1,4-phenylene, or 1,4-phenylene in which H at the lateral position is replaced by F; $Z^2$ represents —COO—, —$C_2H_4$— or a single bond; $X^4$, $X^5$, $X^6$, $X^7$, $X^8$, and $X^9$ each independently represents H or F.

The item 4 is a liquid crystal composition according to the item 3 which comprises 5 to 40% of the first component, 10 to 90% of the second component, and 5 to 50% of a third component based on the total weight of the liquid crystal composition, respectively.

The item 5 is a liquid crystal display device comprising the liquid crystal composition described in any one of the items 1 to 4.

The present invention is described in more detail below. The preferable compounds of a first component constituting the liquid crystal composition of the present invention can be illustrated by those expressed by the following formulae (1-1) to (1-3).

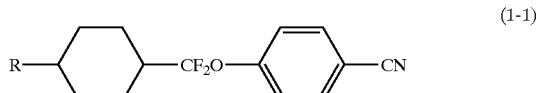

(1-1)

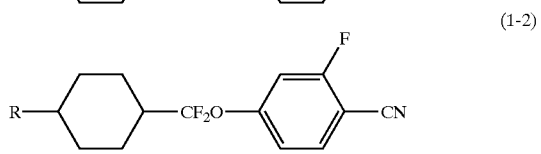

(1-2)

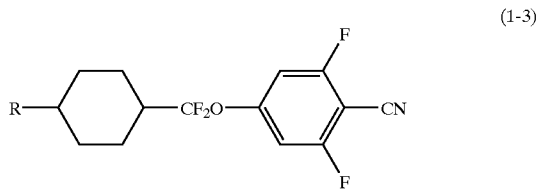

(1-3)

In these formulae, R is preferably alkyl having 1 to 10 carbon or alkenyl having 2 to 10 carbon.

The compounds expressed by formulae (2-1) to (2-4) of a second component constituting the liquid crystal composition of the present invention are explained as follows.

The compound expressed by formulae (2-1-1) to (2-1-4) is preferably used among the compound expressed by formula (2-1).

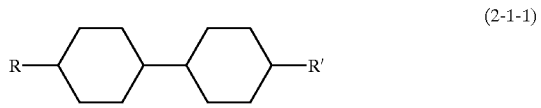

(2-1-1)

-continued

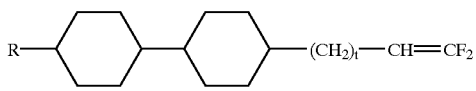
(2-1-2)

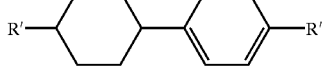
(2-1-3)

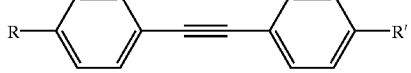
(2-1-4)

In these formulae, R represents preferably alkyl having 1 to 10 carbon or alkenyl having 2 to 10 carbon, R' represents preferably alkyl or alkoxy having 1 to 10 carbon, or alkoxymethyl or alkenyl having 2 to 10 carbon, and t is an integer of 0 to 8.

The compound expressed by formulae (2-2-1) or (2-2-2) is preferably used in the compound expressed by formula (2-2).

(2-2-1)

(2-2-2)

In these formulae, R represents preferably alkyl having 1 to 10 carbon or alkenyl having 2 to 10 carbon, R' represents preferably alkyl, alkoxy or alkoxymethyl having 1 to 10 carbon, or alkenyl having 2 to 10 carbon, and t is an integer of 0 to 8.

The compound expressed by formulae (2-3-1) or (2-3-2) is preferably used among the compound expressed by formula (2-3).

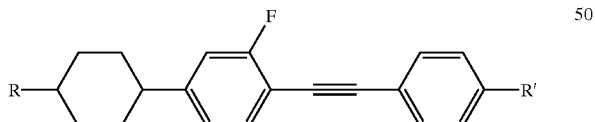
(2-3-1)

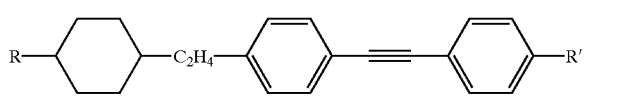
(2-3-2)

In these formulae, R and R' are preferably each independently alkyl having 1 to 10 carbon.

The compound expressed by formulae (2-4-1) or (2-4-2-) is preferably used among the compound expressed by formula (2-4).

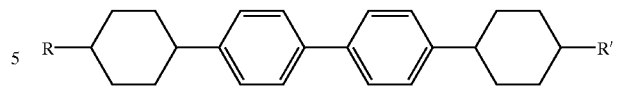
(2-4-1)

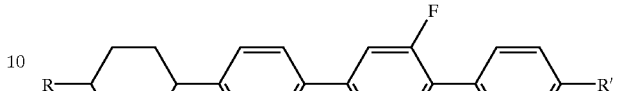
(2-4-2)

In these formulae, R and R' are preferably each independently alkyl having 1 to 10 carbon or alkoxymethyl having 2 to 10 carbon.

The compound expressed by the following formulae (3-1) to (3-9) is preferably used among the compound expressed by formula (3) of a third component constituting the liquid crystal composition of the present invention.

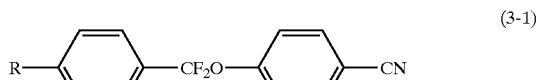
(3-1)

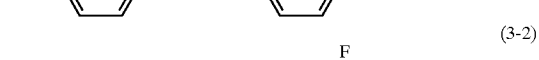
(3-2)

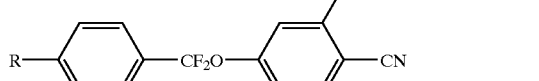
(3-3)

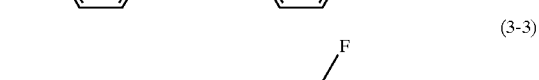
(3-4)

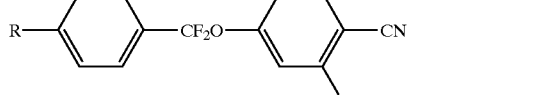
(3-5)

(3-6)

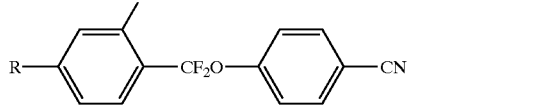
(3-7)

-continued

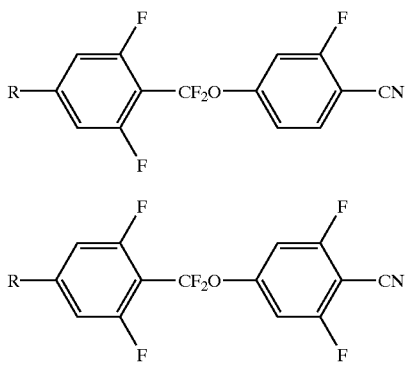

(3-8)

(3-9)

In these formulae, R is preferably alkyl having 1 to 10 carbon or alkenyl having 2 to 10 carbon.

The compound expressed by the following formulae (4-1) to (4-11) is preferably used among the compound expressed by formula (4) of a third component constituting the liquid crystal composition of the present invention.

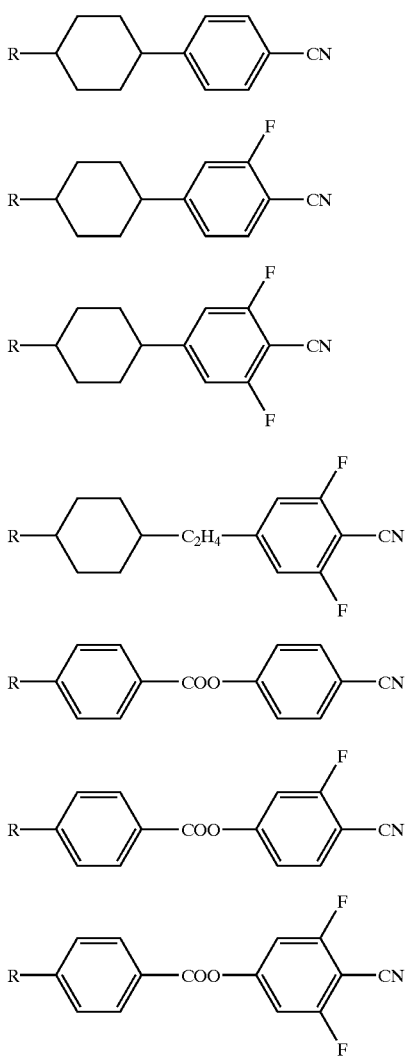

(4-1)
(4-2)
(4-3)
(4-4)
(4-5)
(4-6)
(4-7)

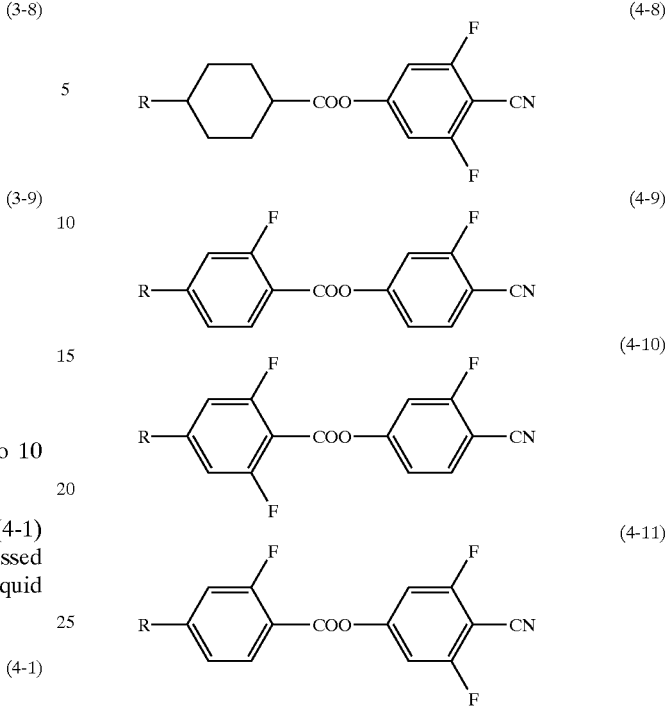

(4-8)
(4-9)
(4-10)
(4-11)

In these formulae, R represents preferably alkyl having 1 to 10 carbon, alkenyl having 2 to 10 carbon or alkoxymethyl having 2 to 10 carbon.

Followings are explanation of preferable ratios of compounds constituting the liquid crystal composition of the present invention and their reasons.

The content of a first component in the liquid crystal composition of the present invention is preferably 5 to 40% based on the total weight of the composition. When it is less than 5%, it is not desirable because the object of the present invention such as keeping high stability against heat and ultraviolet rays, lowering threshold voltage, minimizing temperature dependence of the threshold voltage, and improving frequency dependence of dielectric anisotropy ($\Delta\epsilon$) at low temperature region, may not be achieved. While the content of a first component exceeds 40%, it is not desirable because viscosity of the liquid crystal composition may be increased or a clearing point (NI point) may be lowered.

The content of a second component is preferably 10 to 90% based on the total weight of the liquid crystal composition. When it is less than 10%, the effect of minimizing viscosity of liquid crystal composition, which is the object of the present invention, may not be obtained. When it exceeds 90%, it is not desirable because threshold voltage of liquid crystal composition may be increased.

In case of using a third component in the present invention, the content is preferably 5 to 50% based on the total weight of the liquid crystal composition. When it is less than 5%, it is not desirable because the effect of further lowering threshold voltage, which is the object of the present invention, may not be obtained. When the content exceeds 50%, viscosity of the obtained liquid crystal composition may be increased, the lower temperature limit of a nematic phase may be elevated, or frequency dependence of dielectric anisotropy ($\Delta\epsilon$) may be increased.

The characteristics of the present invention including low threshold voltage, small temperature dependence of the threshold voltage and low viscosity (η) can be attained by using a first and a second components, or using a first, a second and a third components described above.

The liquid crystal composition of the present invention can contain liquid crystal compounds other than a first, a second and a third components if necessary. However, it is desirable especially to obtain the effect of improving frequency dependence of dielectric anisotropy (Δ∈) at low temperature region that the liquid crystal compounds having 5 or more dielectric anisotropy value (Δ∈) and having 3 or more six-membered rings are excluded.

Followings are explanation of functions of compounds constituting the liquid crystal composition of the present invention.

The compound expressed by formula (1), which is a first component of the present invention, has features that dielectric anisotropy is large, the ratio on the temperature dependence of dielectric anisotropy is nearly equal to that on the temperature dependence of an elastic constant, and stability against heat and ultraviolet rays is extremely high. For this reason, the compound expressed by formula (1) in the present invention has functions that threshold voltage is small, temperature dependence of the threshold voltage is minimized, and frequency dependence of dielectric anisotropy (Δ∈) at low temperature is improved while high stability against heat or ultraviolet rays in the liquid crystal composition is highly maintained The compound expressed by formula (2-1) to (2-4), which is a second component of the present invention, has features that dielectric anisotropy is nearly zero or small positive and viscosity is low. Each compound has different clear points and optical anisotropy. For this reason, a second component in the present invention has functions that a clear point, optical anisotropy and threshold voltage of the liquid crystal composition are adjusted.

The compound expressed by formula (2-1), which is a second component in the present invention, has features that dielectric anisotropy is nearly zero and viscosity is low. For this reason, the compound expressed by formula (2-1) in the present invention is used for the object of adjusting threshold voltage of the liquid crystal composition together with lowering viscosity of the liquid crystal composition. The compound expressed by formula (2-2) has features that dielectric anisotropy is nearly zero or small positive, a clearing point is high, and viscosity is low. For this reason, the compound expressed by formula (2-2) in the present invention has functions to lower viscosity and to elevate a clearing point of the liquid crystal composition at the same time, and also to adjust threshold voltage. The compound expressed by formula (2-3) has features that dielectric anisotropy is nearly zero, a clearing point is high, viscosity is low, and optical anisotropy is large. For this reason, the compound expressed by formula (2-3) is used for the object of lowering viscosity and elevating a clearing point of the liquid crystal composition at the same time, and further., adjusting optical anisotropy and threshold voltage of the liquid crystal composition in the present invention. The compound expressed by formula (2-4) has features that dielectric anisotropy is nearly zero, a clearing point is extremely high. For this reason, the compound expressed by formula (2-4) is used for the object of further elevating a clearing point of the liquid crystal composition and adjusting threshold voltage in the present invention.

The compound expressed by formulae (3) and (4), which is a third component of the present invention, has a dielectric anisotropy value which is almost equal to or less than that of the compound expressed by formula (1). For this reason, the compound expressed by formulae (3) and (4) in the present invention is used for the object of further lowering threshold voltage of the liquid crystal composition.

The significance of the present invention exists in achievement of the liquid crystal composition having especially low threshold voltage, small temperature dependence of the threshold voltage, high stability against heat and, ultraviolet rays, and improved frequency dependence of dielectric anisotropy (Δ∈) at low temperature, while fulfilling general characteristics required to conventional STN display materials.

Each compound constituting the liquid crystal composition of the present invention can be prepared by the method of or by referring prior art shown below.

The compound expressed by formula (1) in the present invention, for example the compound expressed by formula (1-3), is described on its synthetic method in JP 10-204016 A. Other compounds expressed by formula (1) can also be prepared by referring method described in the reference.

Among compounds expressed by formula (2-1) or,(2-2), the compound expressed by formula (2-1-2) or (2-2-2), for example, is described on its synthetic method in JP 1-308239 A. Among the compound expressed by formula (2-3), the compound expressed by formula (2-3-1), for example, is described on its synthetic method in JP 63-152334 A. Among the compound expressed by formula (2-4), the compound expressed by formula (2-4-2), for example, is described on its synthetic method in JP 2-237949 A.

The synthetic method of the compound expressed by formula (3) in the present invention, for example the compounds expressed by formulae (3-3) and (3-9), are described in WO96/11897 and Japanese Patent Application 9-72708, respectively. Other compounds expressed by formula (3) can also be prepared by referrring method described in the reference. Among the compounds expressed by formula (4) in the present invention, for example the compound expressed by formulae (4-2) and (4-7), are described on the synthetic method in JP 59-176240 A and JP 4-300861 A, respectively.

Thus, each compound constituting the composition of the present invention can be prepared by the method of or by referring prior art.

To the liquid crystal composition of the present invention, small amount of liquid crystal compound other than a first, a second and a third components can be mixed to the extent not affecting the object of the present invention. The liquid crystal composition of the present invention itself can be prepared by conventional method. Usually such a method is that various compounds of component are mixed and dissolved each other at high temperature. To the liquid crystal composition of the present invention, chiral dopants can be added in order to obtain necessary twist angle by inducing the spiral structure of liquid crystal molecules.

Also the liquid crystal composition of the present invention can be used for guest-host mode by adding dichroic dyes such as melocyanines, styrils, azos, azomethines, azoxys, quinophthalones, anthraquinones, and tetrazines. It can also be used as liquid crystal composition for polymer-dispersion type liquid crystal display device, birefringence control mode or dynamic scattering mode.

EXAMPLES

The present invention will be described in more detail with reference to Examples. However, it should be understood that the scope of the present invention is by no means restricted to Examples shown below. Mixing ratio of all components shown in Examples and Comparative Examples is indicated in percentage by weight. The compounds used in Examples and Comparative Examples are designated by symbols according to the definition shown in Table 1.

TABLE 1

Notation of Compounds Using Symbols
R—(A$_1$)—Z$_1$— ... —Z$_n$—(A$_n$)—X

1) Left terminal group R—

| | |
|---|---|
| C$_n$H$_{2n+1}$ | n— |
| C$_n$H$_{2n+1}$CH=CHC$_m$H$_{2m}$— | nVm— |
| C$_n$H$_{2n+1}$OC$_m$H$_{2m}$— | nOm— |
| CH$_2$=CHC$_n$H$_{2n}$— | Vn— |
| CH$_2$=CH— | V— |
| CF$_2$=CH— | VFF— |
| CF$_2$=CHC$_n$H$_{2n}$— | VFFn— |

2) Ring structure —(A$_1$)—, —(A$_n$)—

| | |
|---|---|
|  | H |
|  | B |
| 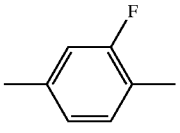 | B(F) |
| 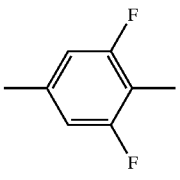 | B(F, F) |
| 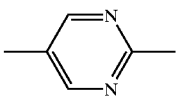 | Py |

3) Bonding group —Z$_1$—, —Z$_n$—

| | |
|---|---|
| —C$_2$H$_4$— | 2 |
| —COO— | E |
| —C≡C— | T |
| —CF$_2$O— | CF2O |

4) Right terminal group —X

| | |
|---|---|
| —CN | —C |
| —OC$_n$H$_{2n+1}$ | —On |
| —F | —F |
| —C$_n$H$_{2n+1}$ | —n |
| —CH=CF$_2$ | —VFF |

5) Notation example

Example 1  3-BCFOB(F, F)-C

TABLE 1-continued

Notation of Compounds Using Symbols
R—(A$_1$)—Z$_1$— ... —Z$_n$—(A$_n$)—X

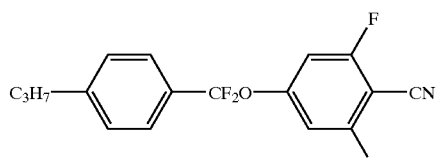

Example 2 VFF2-HHB-1

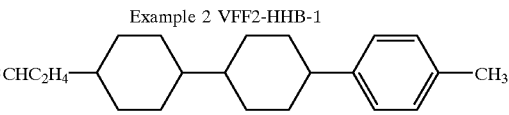

Characteristics of the liquid crystal composition are designated as $T_{NI}$ for the upper temperature limit of a nematic liquid crystal phase, $T_c$ for the lower temperature limit of a nematic liquid crystal phase, η for viscosity, Δn for optical anisotropy, $V_{th}$ for threshold voltage, δ for temperature dependence of the threshold voltage, dH for stability against heat, dUV for stability against ultraviolet rays, γ for steepness, and $F_{10}$ for frequency dependence of dielectric anisotropy (Δ∈).

The upper temperature limit of a nematic liquid crystal phase, $T_{NI}$, was measured with a polarized light microscope, by observing the state of transition from a nematic phase to an isotropic liquid phase in the course of rising temperature.

The lower temperature limit of a nematic liquid crystal phase, $T_c$, was judged by the temperature of the freezer in which crystals or a smectic phase appeared, when the liquid crystal composition was left for 30 days in the freezers each set at 0° C., -10° C., -20° C., -30° C., and -40° C. For example, if the liquid crystal composition kept a nematic state at -20° C. and changed to crystals or a smectic state at -30° C., $T_c$ of the liquid crystal composition was expressed as <-20° C.

Viscosity η was measured with E-type rotational viscometer at 20° C.

Optical anisotropy Δn was measured at 25° C. with Abbe refractometer using a light source having wave length of 589 nm.

$V_{th}$ was obtained from V-T curve measured at 25° C.

Temperature dependence of threshold voltage δ was obtained by the equation (A) below measuring $V_{th}$ at 20° C. and 50° C. The smaller value of δ means the less temperature dependence of threshold voltage.

$$\delta(V/°C.)=[V_{th20}(V)-V_{th50}(V)]/[50° C.-20° C.] \quad (A)$$

In equation (A), $V_{th50}$ and $V_{th20}$ each represents $V_{th}$ at 20° C. and 50° C., respectively. Each $V_{th}$ at 20° C., 25° C. and 50° C. was the value of applied voltage when the ratio of light transmitting the cell became 90% in the cell having 9.0 μm thickness and a twist angle of 80° under the impression of a rectangular wave of 32 Hz frequency in normally white mode.

Stability against heat dH was obtained by the equation (B) below. The smaller dH means the higher stability against heat.

$$dH(\mu A)=I_{ha}(\mu A)-I_{hb}(\mu A) \quad (B)$$

In equation (B), $I_{ha}$ represents a value of electric current passing in the liquid crystal composition after heating, and $I_{hb}$ represents a value of electric current passing in the liquid crystal composition before heating. Heating of the liquid crystal composition was carried out in air at 150° C. for 1 hour. TN cell was prepared with two glass palates deposited by vapor of silicon oxide diagonally and faced each other with 10 μm thickness and electrode area of 1 cm², and was filled with the liquid crystal composition for evaluation. A value of electric current was measured by applying a rectangular wave of 3 volts and 32 Hz to the TN cell. Measurement of the value of electric current was carried out at 25° C.

Stability against ultraviolet rays dUV was obtained by equation (C) below. The smaller dUV means the higher stability against ultraviolet rays.

$$dUV(\mu A) = I_{uva}(\mu A) - I_{uvb}(\mu A) \quad (C)$$

In equation (C), $I_{uva}$ represents a value of electric current passing in the liquid crystal composition after irradiation of ultraviolet rays, and $I_{uvb}$ represents a value of electric current passing in the liquid crystal composition before irradiation of ultraviolet rays.

The liquid crystal composition was sealed into a cell for evaluation (the same with TN cell described above) Ultraviolet rays emitted from ultra high voltage mercury lamp (manufactured by Ushio Denki Co.) was irradiated with energy of 12 mW/cm² for 20 minutes to the cell. The distance between light source and the object was 20 cm. A value of electric current was measured just as described above.

Steepness γ was obtained by equation (D) below. The closer to 1 of γ means the higher steepness.

$$\gamma = V_{20}/V_{80} \quad (D)$$

In equation (D), $V_{20}$ and $V_{80}$ each represents the applied voltage value at which transmission ratio of light transmitting the cell reaches 20% and 80%, respectively in normally yellow mode. Measurement of $V_{20}$ and $V_{80}$ was carried out by applying rectangular wave of 70 Hz frequency at 25° C. using a cell having a twist angle of 240° and cell thickness of (0.80/Δn) μm. The liquid crystal composition used in this measurement contained cholesteryl nonanoate as a chiral dopant to adjust the ratio of cell thickness d and pitch length of twist P (d/P) to be 0.50 for 100 part of the liquid crystal composition.

Frequency dependence of dielectric anisotropy (Δ∈) $F_{10}$ was designated as the frequency giving Δ∈ 10% less than Δ∈ at low frequency (100 Hz) Frequency dependence of dielectric anisotropy (Δ∈) at low temperature region was studied by measuring at −20° C.

As shown in FIG. 1, dielectric anisotropy (Δ∈) decreases as frequency shifts higher. Large $F_{10}$ means that Δ∈ value remains constant toward higher frequency region, that is, frequency dependence of the liquid crystal composition is small, which means to be excellent.

Comparative Example 1

As a similar composition to the composition of the present invention, a liquid crystal composition described in compositional example 19 of WO96/11897 was prepared.

| | |
|---|---|
| 3-HBCF2OB(F,F)—C | 6% |
| 5-HBCF2OB(F,F)—C | 6% |
| 3-HB(F,F)CF2OB—C | 6% |
| 5-HB(F,F)CF2OB—C | 6% |
| 2O1-BEB(F)—C | 2% |
| 3O1-BEB(F)—C | 8% |
| 2-HB(F)—C | 5% |
| 3-HB(F)—C | 7% |
| 3-HHB(F)—C | 3% |
| 2-HHB(F)—F | 5% |
| 3-HHB(F)—F | 5% |
| 5-HHB(F)—F | 5% |
| 3-H2BTB-2 | 4% |
| 3-H2BTB-3 | 4% |
| 3-H2BTB-4 | 4% |
| 3-HB(F)TB-2 | 4% |
| 3-HB(F)TB-3 | 4% |
| 3-HB(F)TB-4 | 4% |
| 3-HHB-1 | 6% |
| 3-HHB-3 | 3% |
| 3-HHB—O1 | 3% |

The above composition had the following characteristics.

$T_{NI}$=97.7° C.
$T_c$<−20° C.
η=38.4 mPa·s
Δn=0.141
$V_{th}$=1.52V
δ=0.013V/°C.
dH=0.05 μA
dUV=0.10 μA
γ=1.113
$F_{10}$=950 Hz

Also γ of the above liquid crystal composition is 1.113, temperature dependence of threshold voltage is large and steepness is poor. Further, it has drawbacks that $F_{10}$ value is small as 950 Hz and frequency dependence of dielectric anisotropy (Δ∈) at low temperature is poor.

Comparative Example 2

As a similar composition to the composition of the present invention, a liquid crystal composition described in example 46 of JP 10-251186 A was prepared.

| | |
|---|---|
| 3-HBCF2OB(F,F)—C | 5% |
| 3-BCF2OB(F,F)—C | 5% |
| 3-H2B(F)CF2OB(F,F)—F | 5% |
| 1V2-BEB(F,F)—C | 5% |
| 3-HB—C | 20% |
| 1-BTB-3 | 5% |
| 2-BTB-1 | 10% |
| 3-HH-4 | 11% |
| 3-HHB-1 | 7% |
| 3-HHB-3 | 9% |
| 3-H2BTB-2 | 4% |
| 3-H2BTB-3 | 4% |
| 3-H2BTB-4 | 4% |
| 3-HB(F)TB-2 | 6% |

The above composition had the following characteristics.

$T_{NI}$=74.7° C.
$T_c$<−30° C.
η=15.2 mPa·s
Δn=0.146
$V_{th}$=1.67V
δ=0.018V/°C.
dH=0.15 μA dUV=0.31 μA

γ=1.114

$F_{10}$2500 Hz

Also this compound has drawbacks that γ is 1.114, temperature dependence of threshold voltage is large, steepness is poor, $F_{10}$ value is 2500 Hz and frequency dependence of dielectric anisotropy (Δ∈) at low temperature is poor ($F_{10}$ is small).

Comparative Example 3

As a similar composition to the composition of the present invention, a liquid crystal composition described in Example 49 of JP 10-251186 A was prepared.

| | |
|---|---|
| 3-BCF2OB(F,F)—C | 5% |
| V2-BCF2OB(F,F)—C | 5% |
| 5-PyB-F | 4% |
| 3-PyB(F)—F | 4% |
| 2-BB—C | 5% |
| 4-BB—C | 4% |
| 5-BB—C | 5% |
| 3-PyB-2 | 2% |
| 6-PyB—O5 | 3% |
| 6-PyB—O6 | 3% |
| 3-PyBB—F | 6% |
| 4-PyBB—F | 6% |
| 5-PyBB—F | 6% |
| 3-HHB-1 | 6% |
| 3-HHB-3 | 8% |
| 2-H2BTB-2 | 4% |
| 2-H2BTB-3 | 4% |
| 2-H2BTB-4 | 5% |
| 3-H2BTB-2 | 5% |
| 3-H2BTB-3 | 5% |
| 3-H2BTB-4 | 5% |

The above composition had the following characteristics.

$T_{NI}$=82.7° C.

$T_c$<-20° C.

η=33.6 mPa·s

Δn=0.193

$V_{th}$=1.82V

δ=0.024V/°C.

dH=0.24 μA duv=0.45 μA

γ=1.203

$F_{10}$=800 Hz

This composition had drawbacks that γ is 1.203, temperature dependence of threshold voltage is large, steepness is poor, $F_{10}$ value is 800 Hz and frequency dependence of dielectric anisotropy (Δ∈) at low temperature is poor ($F_{10}$ is small).

EXAMPLE 1

A liquid crystal composition was prepared using the following compounds selected from those expressed by formula (1) as a first component,

| | |
|---|---|
| 2-HCF2OB(F,F)—C | 5% |
| 3-HCF2OB(F,F)—C | 5% |
| 4-HCF2OB(F,F)—C | 3% |
| 5-HCF2OB(F,F)—C | 5% | and the following compounds selected from those expressed by formulae (2-1) to (2-4) as a second component.

| | |
|---|---|
| 3-HH-4 | 10% |
| 3-HB—O2 | 15% |
| 2-BTB-1 | 3% |
| 3-HHB-1 | 9% |
| 3-HHB-3 | 10% |
| 3-HB(F)TB-2 | 6% |
| 3-HB(F)TB-3 | 6% |
| 3-HB(F)TB-4 | 6% |
| 3-H2BTB-2 | 6% |
| 3-H2BTB-3 | 6% |
| 3-H2BTB-4 | 5% |

Characteristics of the above composition were as follows.

$T_{NI}$=94.6° C.

$T_c$<-30° C.

η=16.5 mPa·s

Δn=0.145

$V_{th}$=2.45V

δ=0.002V/°C.

dH=0.03 μA dUV=0.04 μA

γ=1.045

$F_{10}$=20000 Hz

This composition is superior in steepness, has small temperature dependence of threshold voltage, and has high stability against heat and ultraviolet rays. Also it has large $F_{10}$ value, namely, it can keep constant Δ∈ value toward higher frequency region, has small frequency dependence of dielectric anisotropy (Δ∈) at low temperature that means good frequency dependence.

EXAMPLE 2

A liquid crystal composition was prepared using the following compounds selected from those expressed by formula (1) as a first component,

| | |
|---|---|
| 2-HCF2OB(F)—C | 4% |
| 3-HCF2OB(F)—C | 5% |
| 4-HCF2OB(F)—C | 4% | and the following compounds selected from those expressed by formulae (2-1) to (2-4) as a second component.

| | |
|---|---|
| 3-HH-4 | 7% |
| 3-HB—O2 | 19% |
| 2-BTB-1 | 10% |
| 3-HHB-1 | 10% |
| 3-HHB-3 | 13% |
| 3-HB(F)TB-2 | 6% |
| 3-HB(F)TB-3 | 6% |
| 3-H2BTB-2 | 6% |
| 3-H2BTB-3 | 5% |
| 3-H2BTB-4 | 5% |

Characteristics of the above component were as follows.

$T_{NI}$=95.5° C.

$T_c$<-30° C.

η=11.5 mPa·s

Δn=0.137

$V_{th}$=2.56V

δ=0.003V/°C.

dH=0.03 µA dUV=0.04 µA

γ=1.036

$F_{10}$=19000 Hz

This composition is superior in steepness, has small temperature dependence of threshold voltage, has high stability against heat and ultraviolet rays, and is excellent in frequency dependence of dielectric anisotropy (Δ∈) at low temperature.

EXAMPLE 3

A liquid crystal composition was prepared using the following compounds selected from those expressed by formula (1) as a first component,

| | |
|---|---|
| 2-HCF2OB(F,F)—C | 5% |
| 3-HCF2OB(F,F)—C | 5% | the following compounds selected from those expressed by formulae (2-1) to (2-4) as a second component

| | |
|---|---|
| 3-HHB-1 | 9% |
| 3-HHB-3 | 10% |
| VFF2-HHB-1 | 20% |
| 3-HB(F)TB-2 | 6% |
| 3-H2BTB-2 | 5% |
| 3-H2BTB-3 | 5% |
| 1O1-HBBH-5 | 5% | and the following compounds selected from those expressed by formula (4) as a third component.

| | |
|---|---|
| 3O1-BEB(F)—C | 5% |
| 2-HB(F)—C | 5% |
| 3-HB(F)—C | 20% |

Characteristics of the above composition were as follows.

$T_{NI}$=92.8° C.

$T_c$<-30° C.

η=23.4 mPa·s

Δn=0.129

$V_{th}$=1.56V

δ=0.003V/°C.

dH=0.03 µA dUV=0.04 µA

γ=1.046

$F_{10}$=7500 Hz

This composition is superior in steepness, has small temperature dependence of threshold voltage, has high stability against heat and ultraviolet rays and has excellent frequency dependence of dielectric anisotropy (Δ∈) at low temperature.

EXAMPLE 4

A liquid crystal composition was prepared using the following compounds selected from those expressed by formula (1) as a first component,

| | |
|---|---|
| 3-HCF2OB—C | 5% |
| 3-HCF2OB—C | 5% |
| 3-HCF2OB(F,F)—C | 5% | the following compounds selected from those expressed by formulae (2-1) to (2-4) as a second compound

| | |
|---|---|
| 3-HHB-1 | 5% |
| VFF-HHB-1 | 8% |
| VFF2-HHB-1 | 18% |
| 3-HB(F)TB-2 | 6% |
| 3-HB(F)TB-3 | 6% |
| 3-H2BTB-2 | 5% |
| 3-H2BTB-3 | 5% |
| 1O1-HBBH-5 | 5% | and the following compounds selected from those expressed by formula (4) as a third component.

| | |
|---|---|
| 2-B(F)EB(F)—C | 5% |
| 3-HB(F)—C | 22% |

Characteristics of the above composition were as follows.

$T_{NI}$=95.4° C.

$T_c$<-30° C.

η=23.0 mPa·s

Δn=0.139

$V_{th}$=1.57V

δ=0.004V/°C.

dH=0.04 µA dUV=0.04 µA

γ=1.038

$F_{10}$ 6800 Hz

This composition is superior in steepness, has small temperature dependence of threshold voltage, has high stability against heat and ultraviolet rays and is excellent in frequency dependence of dielectric anisotropy (Δ∈) at low temperature.

EXAMPLE 5

A liquid crystal composition was prepared using the following compound selected from those expressed by formula (1) as a first component,

3-HCF2OB(F,F)-C 6% the following compounds selected from those expressed by formulae (2-1) to (2-4) as a second component

| | |
|---|---|
| 3-HH-4 | 10% |
| 3-HB—O2 | 18% |
| 3-HHB-1 | 10% |
| 3-HHB-3 | 10% |
| 3-HB(F)TB-2 | 6% |
| 3-HB(F)TB-3 | 6% |
| 3-HB(F)TB-4 | 6% |

-continued

| | |
|---|---|
| 3-H2BTB-2 | 6% |
| 3-H2BTB-3 | 6% |
| 3-H2BTB-4 | 5% | and the following compound selected from those expressed by formula (3) as a third component.

3-BCF2OB(F,F)-C 12%

Characteristics of the above composition were as follows.

$T_{NI}$=90.9° C.
$T_c$<-30° C.
$\eta$=15.8 mPa·s
$\Delta n$=0.142
$V_{th}$=2.41V
$\delta$=0.002V/°C.
$dH$=0.03 $\mu$A
$dUV$=0.04 $\mu$A
$\gamma$=1.045
$F_{10}$=19000 Hz This composition is superior in steepness, has small temperature dependence of threshold voltage, has high stability against heat and ultraviolet rays and is excellent in frequency dependence of dielectric anisotropy ($\Delta\epsilon$) at low temperature.

EXAMPLE 6

A liquid crystal composition was prepared using the following compounds selected from those expressed by formula (1) as a first component,

| | |
|---|---|
| 3-HCF2OB(F,F)—C | 5% |
| 5-HCF2OB(F,F)—C | 5% | the following compounds selected from those expressed by formulae (2-1) to (2-4) as a second component,

| | |
|---|---|
| 3-HHB-1 | 9% |
| 3-HHB-3 | 5% |
| VFF2-HHB-1 | 20% |
| 3-HB(F)TB-2 | 6% |
| 3-H2BTB-2 | 5% |
| 3-H2BTB-3 | 5% |
| 1O1-HBBH-5 | 5% | the following compound selected from those expressed by formula (3) as a third component

3-BCF2OB(F,F)-C 10% and the following compounds selected from those expressed by formula (4) as a third component.

301-BEB(F)-C 5%

3-HB(F)-C 20%

Characteristics of the above composition were as follows.

$T_{NI}$=84.0° C.
$T_c$<-30° C.
$\eta$=24.0 mPa·s
$\Delta n$=0.126
$V_{th}$=1.38V
$\delta$=0.003V/°C.
$dH$=0.03 $\mu$A
$dUV$=0.04 $\mu$A
$\gamma$=1.047
$F_{10}$=6500 Hz This composition is superior in steepness, has small temperature dependence of threshold voltage, has high stability against heat and ultraviolet rays and is excellent in frequency dependence of dielectric anisotropy ($\Delta\epsilon$) at low temperature.

EXAMPLE 7

A liquid crystal composition was prepared using the following compound selected from those expressed by formula (1) as a first component,

3-HCF2OB(F,F)-C 10% the following compounds selected from those expressed by formulae (2-1) to (2-4) as a second component,

| | |
|---|---|
| 3-HHB-1 | 5% |
| 3-HHB-3 | 6% |
| VFF—HHB-1 | 9% |
| VFF2-HHB-1 | 18% |
| 3-HB(F)TB-2 | 6% |
| 3-H2BTB-2 | 6% |
| 3-H2BTB-3 | 6% |
| 1O1-HBBH-5 | 6% | the following compound selected from those expressed by formula (3) as a third component

3-BCF2OB(F,F)—C 5% and the following compounds selected from those expressed by formula (4) as a third component.

| | |
|---|---|
| 3-HB(F,F)—C | 10% |
| 3-HB(F)—C | 13% |

Characteristics of the above composition were as follows.

$T_{NI}$=87.2° C.
$T_c$<-30° C.
$\eta$=22.3 mPa·s
$\Delta n$=0.130
$V_{th}$=1.51V
$\delta$=0.002V/°C.
$dH$=0.03 $\mu$A
$dUV$=0.03 $\mu$A
$\gamma$=1.049
$F_{10}$=8600 Hz This composition is superior in steepness, has small temperature dependence of threshold voltage, has high stability against heat and ultraviolet rays and is excellent in frequency dependence of dielectric anisotropy ($\Delta\epsilon$) at low temperature.

EXAMPLE 8

A liquid crystal composition was prepared using the following compounds selected from those expressed by formula (1) as a first component,

| | |
|---|---|
| 2-HCF2OB(F,F)—C | 5% |
| 3-HCF2OB(F,F)—C | 5% |
| 5-HCF2OB(F,F)—C | 5% | the following compounds selected from those expressed by formulae (2-1) to (2-4) as a second component,

| | |
|---|---|
| 3-HHB-1 | 9% |
| 3-HHB-3 | 6% |
| VFF2-HHB-1 | 20% |
| 3-HB(F)TB-2 | 5% |
| 3-H2BTB-2 | 5% |
| 3-H2BTB-3 | 5% |
| 1O1-HBBH-5 | 5% | the following compounds selected from those expressed by formula (4) as a third component

| | |
|---|---|
| 3-BEB(F)—C | 5% |
| 3-HB(F)—C | 20% | and the following compound as another component.

| | |
|---|---|
| 3-HHB(F)—C | 5% |

Characteristics of the above composition were as follows.

$T_{NI}$=93.9° C.
$T_c$<−30° C.
η=25.8 mPa·s
Δn=0.132
$V_{th}$=1.51V
δ=0.003V/°C.
dH=0.04 μA
dUV=0.04 μA
γ=1.043
$F_{10}$=6050 Hz

This composition is superior in steepness, has small temperature dependence of threshold voltage, has high stability against heat and ultraviolet rays and is excellent in frequency dependence of dielectric anisotropy (Δ∈) at low temperature.

As described above, liquid crystal compositions obtained by Examples are superior in steepness, have small temperature dependence of threshold voltage, and have high stability against heat and ultraviolet rays. They have also large $F_{10}$ value and small frequency dependence of dielectric anisotropy (Δ∈) at low temperature, namely they can keep constant Δ∈ value toward higher frequency region thus are excellent in frequency dependence.

Utilization Possibility in the Industry

According to the present invention, the liquid crystal compositions are provided which have, above all, low threshold voltage, small temperature dependence, high stability against heat and ultraviolet rays and small frequency dependence of dielectric anisotropy (Δ∈) at low temperature, namely are able to keep constant Δ∈ value toward higher frequency region.

EXPLANATION OF FIGURES

FIG. 1 shows frequency dependence of dielectric anisotropy.

What is claimed is:

1. A liquid crystal composition comprising a first component consisting of the compound(s) expressed by formula (1) and a second component consisting of at least one compound selected from the group of the compounds expressed by formulae (2-1) to (2-4):

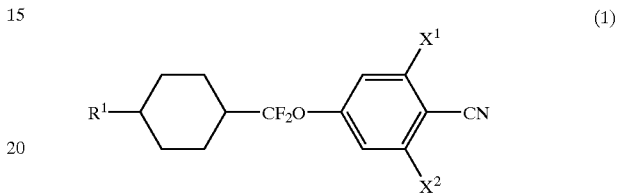

(1)

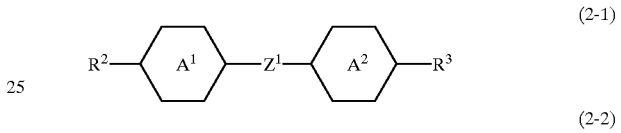

(2-1)

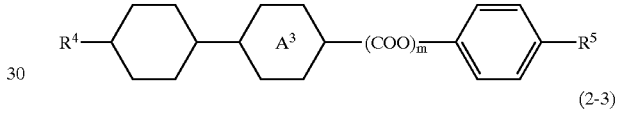

(2-2)

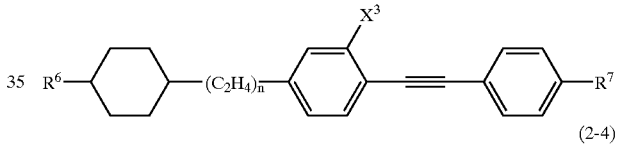

(2-3)

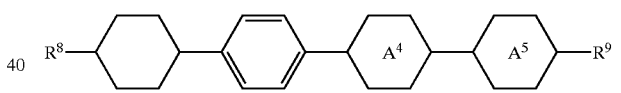

(2-4)

wherein $R^1$ represents alkyl having 1 to 10 carbon atoms in which one methylene may be replaced by —O— or —CH=CH—; $R^2$, $R^3$ and $R^4$ each independently represents alkyl having 1 to 10 carbon atoms in which one methylene may be replaced by —O— or —CH=CH—, and one or more hydrogen atoms may be replaced by fluorine; $R^5$ represents alkyl having 1 to 10 carbon atoms in which one methylene may be replaced by —O—; $R^6$, $R^7$ and $R^9$ each independently represents alkyl having 1 to 10 carbon atoms; $R^8$ represents alkyl having 1 to 10 carbon atoms in which one methylene may be replaced by —O—; $A^1$, $A^2$, $A^3$ and $A^5$ each independently represents trans-1,4-cyclohexylene or 1,4-phenylene; $A^4$ represents 1,4-phenylene in which H at the lateral position may be replaced by F; $Z^1$ represents —C≡C— or a single bond; m and n each independently is an integer of 0 or 1; $X^1$, $X^2$ and $X^3$ each independently represents H or F; and wherein the composition comprises 5 to 40% of the first component and 10 to 90% of the second component each based on the total weight of the liquid crystal composition.

2. A liquid crystal composition according to claim 1 wherein the liquid crystal composition further comprises a third component consisting of at least one compound selected from the compounds expressed by formulae (3) and (4):

(3)

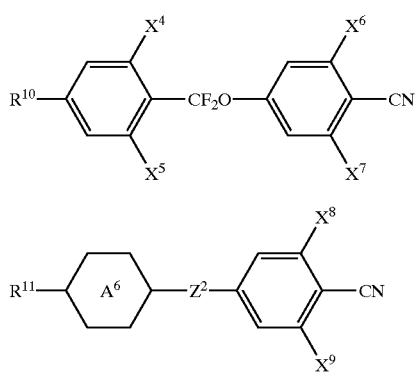

(4)

wherein $R^{10}$ and $R^{11}$ represent alkyl having 1 to 10 carbon atoms in which one methylene may be replaced by —O— or —CH=CH—; $A^6$ represents trans-1,4-cyclohexylene, 1,4-phenylene, or 1,4-phenylene in which H at the lateral position is replaced by F; $Z^2$ represents —COO—, —$C_2H_4$— or a single bond; $X^4$, $X^5$, $X^6$, $X^7$, $X^8$, and $X^9$ each independently represents H or F; and wherein the composition comprises 5 to 40% of the first component, 10 to 90% of the second component, and 5 to 50% of the third component based on the total weight of the liquid crystal composition, respectively.

3. A liquid crystal display device comprising the liquid crystal composition described in claim 1.

4. A liquid crystal display device comprising the liquid crystal composition described in claim 2.

* * * * *